(12) United States Patent
Palmer et al.

(10) Patent No.: US 6,832,756 B2
(45) Date of Patent: Dec. 21, 2004

(54) EXPANDABLE MANDREL

(75) Inventors: Michael J. Palmer, Tamworth, NH (US); S. Scott MacIntyre, Eaton, NH (US)

(73) Assignee: Palmer Machine Co., Inc., Conway, NH (US)

( * ) Notice: Subject to any disclaimer, the term of this patent is extended or adjusted under 35 U.S.C. 154(b) by 0 days.

(21) Appl. No.: 10/345,495

(22) Filed: Jan. 16, 2003

(65) Prior Publication Data

US 2003/0132563 A1 Jul. 17, 2003

Related U.S. Application Data

(60) Provisional application No. 60/349,822, filed on Jan. 17, 2002.

(51) Int. Cl.[7] ............................................... B21D 41/02
(52) U.S. Cl. ..................................................... 269/48.1
(58) Field of Search ................................. 279/2.1, 2.12, 279/2.02, 2.04, 2.01; 29/263; 294/86.24, 86.25; 269/48.1

(56) References Cited

U.S. PATENT DOCUMENTS 3,986,383 A * 10/1976 Petteys ....................... 269/48.1
5,516,086 A * 5/1996 Tankersley ................. 269/48.1

* cited by examiner

Primary Examiner—Robert C. Watson
(74) Attorney, Agent, or Firm—Grossman, Tucker, Perreault & Pfleger, PLLC

(57) ABSTRACT

An expandable mandrel for holding a workpiece, including a mandrel body having an interior surface and an exterior surface. The interior surface defines at least first and second interior regions separated by a transition surface, the first region having a cross sectional area greater than a cross-sectional area of the second region. A plurality of slots extend between the interior surface and the exterior surface. A slave actuator having a bearing surface is at least partially disposed in the first region, and a master actuator is provided for urging the bearing surface against the transition surface to expand the mandrel against the workpiece.

17 Claims, 2 Drawing Sheets

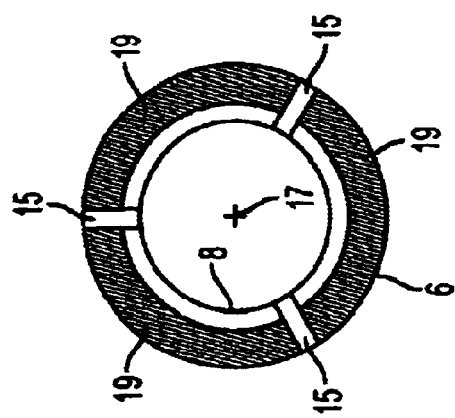
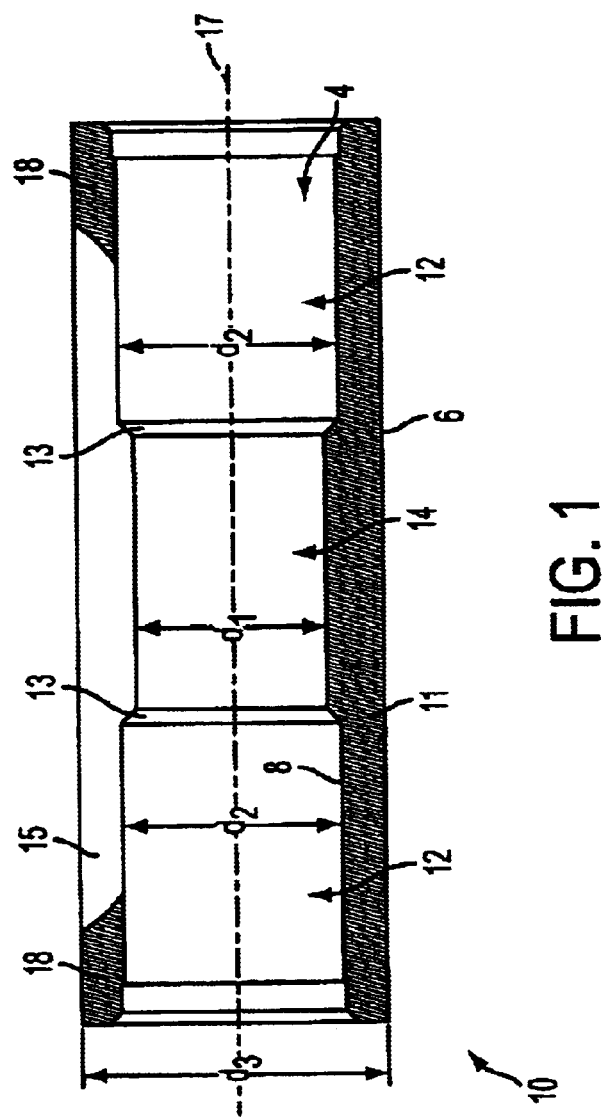

EXPANDABLE MANDREL

CROSS-REFERENCE TO RELATED APPLICATIONS

This application claims the benefit of the filing date of U.S. Provisional Application No. 60/349,822, filed on Jan. 17, 2002, the entire disclosure of which is incorporated by reference.

FIELD OF THE INVENTION

This invention relates to an expandable work-holding mandrel for use in a variety of manufacturing operations/processes.

BACKGROUND OF THE INVENTION

Expanding mandrels were initially developed for securely holding and locating a workpiece by its inside diameter in order to perform various types of manufacturing operations on the workpiece. Some of these manufacturing operations include: turning material from the outside diameter of a bushing on a lathe; grinding material from the outside diameter cylindrically, or grinding flats and keyways on a hollow shaft; drilling or boring blind holes, milling flats, keyways, or slots on a workpiece; and performing inspection operations with the mandrel located between work centers.

Traditionally, expanding mandrel designs employ a hardened steel arbor that tapers down gradually along its entire length. A hardened steel sleeve with a matching but slightly smaller inside taper with long opposing slots is pressed over the arbor. As the sleeve is pressed down over the arbor, the sections created by the long slots are forced outward by the interference between the two tapers and away from, but roughly parallel to, the centerline of the tapered arbor. This common type of expanding mandrel, while having been in use for many years, has never been a particularly accurate method for workpiece fixturing and holding. Also, this type of expanding mandrel cannot be easily machined after hardening, and hardening is required for the mandrel to function properly. In addition, this hardening or toughening of the mandrel body makes conventional cross-machining through the workpiece and into the body of the mandrel such as drilling and/or reaming difficult if not impossible.

A number of different approaches for expanding mandrel designs have emerged in recent years. One such type of mandrel uses a series of spacers between which round rubber O-rings are employed. The spacers are fixed at one end of the body of the mandrel, and an actuator (typically a threaded collar or nut) compresses the full assembly toward the fixed end. This linear force causes a compression of the numerous O-rings producing a slight expansion to the O-rings nominal outside diameters. These expanded O-rings in turn capture the inside diameter of a workpiece to both locate and secure it to the body of a mandrel. This type of mandrel requires a very tightly controlled size tolerance for the workpiece inside diameter to function properly. It is also a costly mandrel to manufacture requiring a large number of components, and must also be manufactured from hardened steel to hold up to the high loading forces present during its use.

Accordingly, there is a need for an expanding mandrel that accurately, reliably, and conveniently holds a work piece and is cost-effective to produce.

SUMMARY OF THE INVENTION

According to a first aspect of the present invention, it is recognized that expanding mandrels, while varying in design, are conventionally manufactured from hardened steel. This hardening of the mandrel makes conventional machining of the mandrel body a difficult and expensive process using standard tooling. Accordingly, one aspect of the present invention is to provide and expanding mandrel that need not be made from hardened steel, and may be machined by turning the body of the mandrel to a given diameter in a CNC (Computer Numerical Control) or a conventional engine lathe.

According to a second aspect of the present invention, it is recognized that hardened mandrel bodies prevent conventional cross-machining through the workpiece and into the mandrel body such as drilling, reaming, or boring. The present invention provides a mandrel the may be machined using conventional machine tools and operations.

According to yet another aspect of the present invention, a mandrel is provided allowing a very close cylindrical centerline relationship to be maintained between the inside and outside diameters of a workpiece. Consistent with this aspect, an expanding mechanism is provided to hold a true position relative to the centerline of the mandrel body through repeated expansive cycles, reducing typical centerline error by maintaining the functional relationship of the expanding cross sections of the mandrel relative to the centers machined into the end members.

An expandable mandrel is provided including a mandrel body having an interior surface and an exterior surface. The interior surface defines first and second interior regions separated by a transition surface, the first region having a cross-sectional area greater than a cross-sectional area of the second region. A plurality of slots extend between the interior surface and the exterior surface. Each of the slots traverses at least a portion of the first and second regions. A slave actuator having a bearing surface is at least partially disposed in the first region, and a master actuator is provided for urging the bearing surface against the transition surface.

According to a particular embodiment, the mandrel is formed as a tube having a larger inside diameter at each end relative to the inside diameter in a central region of the tube. A plurality of longitudinally oriented slots extend through the wall of the tube, with each end of the tube being circumferentially continuous. A master actuator is disposed in each end of the tube. The master actuator is supported by captive supports in each end of the tube, and drives a slave actuator toward the center of the tube, and into a tapered or rounded transition region between the larger inside diameter at each end of the tube and the smaller inside diameter in the central region of the tube. The linear force of the slave actuator against the transition region produces a radially outward force on the tube, causing the tube wall sections between the longitudinal slots to expand outward, increasing the outside diameter of the mandrel. The captive supports desirably include centering features in outwardly facing surfaces.

BRIEF DESCRIPTION OF THE DRAWING

Advantages of the present invention will be apparent from the following detailed description of exemplary embodiments thereof, which description should be considered in conjunction with the accompanying drawings, in which:

FIG. 1 is a plan sectional view of an exemplary mandrel body consistent with the present invention;

FIG. 2 is an end sectional view of the exemplary mandrel body illustrated in FIG. 1.

DETAILED DESCRIPTION

Figure 3:
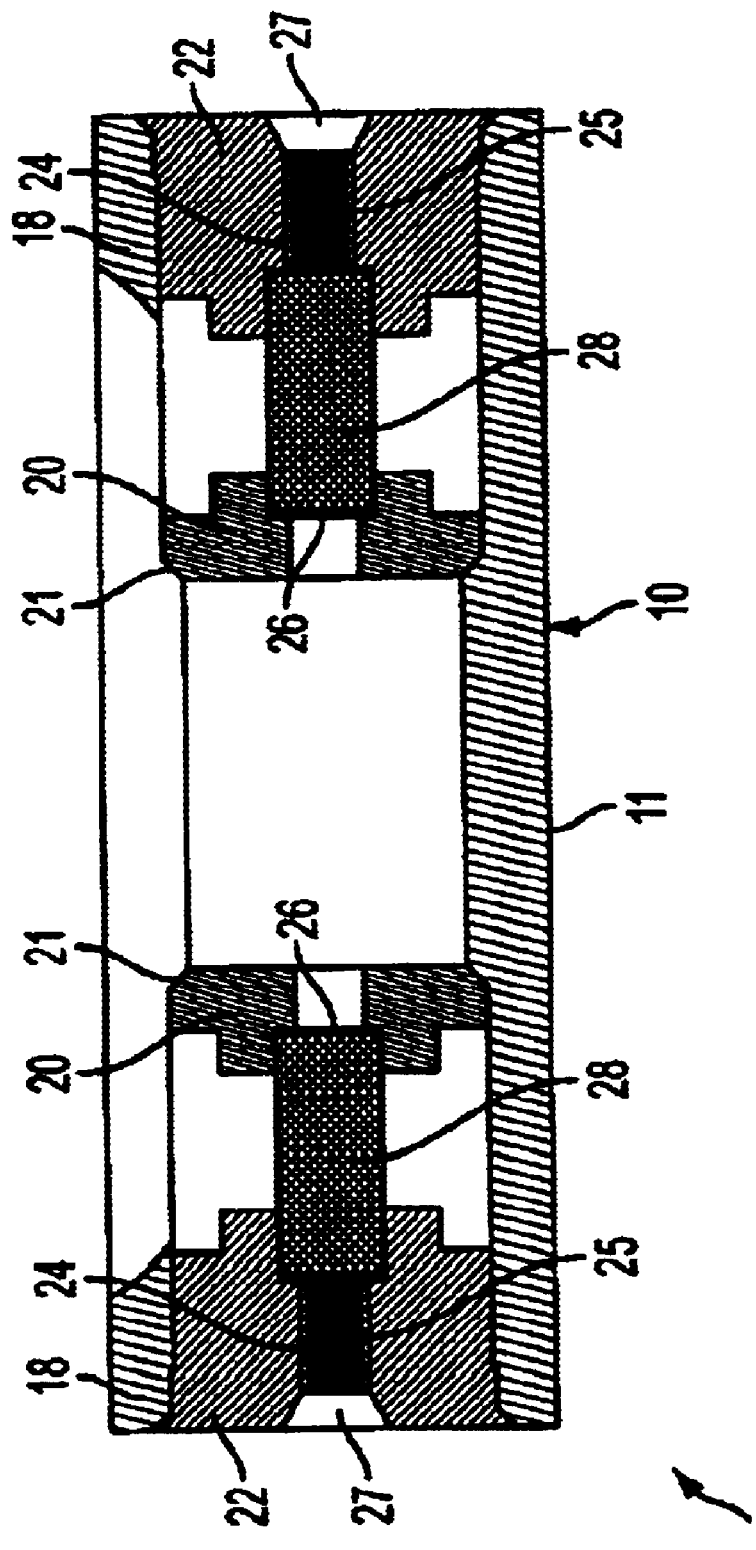
FIG. 3 is a plan section view of an exemplary expandable mandrel consistent with the present invention, containing necessary actuating components and utilizing the exemplary mandrel body illustrated in FIG. 1 and FIG. 2.

Referring to FIGS. 1 through 3, one exemplary embodiment of an expandable mandrel consistent with the present invention is illustrated. The illustrated mandrel may be used for holding and locating a workpiece during the production of machine tool manufactured products. It is to be understood, however, that the illustrated embodiment is provided by way of illustration, not of limitation.

Referring first to FIGS. 1 and 2, an exemplary tubular mandrel body 10 is illustrated having side wall 11 with an exterior surface 6 and interior surface 8. The interior surface 8 of the body 10 defines an internal passage 4 having central region 14 with an inside diameter d1, and one or more end regions 12 having and an inside diameter d2 that is greater than the inside diameter d1. The cross-sectional area of the central region is thus smaller than the cross-sectional area of the end regions. A transition surface 13 is provided between the central region and the end regions 12. The transition surface 13 preferably has a smooth taper or slope. Alternatively, the transition 13 may be formed having a curved, rather than linear, profile.

The mandrel body 10 also includes openings or slots 15 extending between the interior and exterior surfaces, i.e. through the tubular sidewall 11. The slots 15 extend radially outward from the longitudinal axis 17 of the mandrel body through the tubular sidewall 11. Preferably the slots 15 are arranged at even intervals. In the illustrated exemplary embodiment, the slots 15 are separated by about 120°.

Consistent with the illustrated exemplary embodiment, the slots 15 extend along the central portion 14 of the mandrel body 10, spanning the smaller diameter central region 14, the transition surfaces 13 and a portion of the larger diameter end regions 12. In the illustrated exemplary embodiment, the slots 15 stop short of either end of the mandrel body 10, leaving continuous end regions 18. Continuous end regions 18 increase the ability to maintain a very close cylindrical centerline relationship between the mandrel and the workpiece.

Every pair of adjacent slots 15, defines an expansion section 19 therebetween. While the exemplary embodiment illustrates three slots 15, it should be appreciated that the number of slots 15 may be varied to achieve different expansion characteristics. Similarly, the width of the slots may also be varied to achieve the characteristics of the expansion sections 19.

Referring to FIG. 3, an exemplary complete expandable mandrel 9 consistent with the present invention is illustrated including the above-discussed mandrel body 10. The complete mandrel 9 further includes a slave actuator 20, a master actuator 25 and a captive support 22, associated with each transition surface 13 between each larger inside diameter end region 12 and the smaller inside diameter central region 14.

Each slave actuator 20 is sized to be slidably disposed in the end region 12 of the mandrel body 10 and located adjacent to the transition surface 13. The face of slave actuator adjacent to the transition 13 includes a bearing surface 21. The bearing surface 21 preferably includes a rounded or tapered feature that is configured to bear on and engage the tapered or curved transition surface 13.

Master actuator 25 includes a load providing system configured to apply a force on slave actuator 20 along the center axis 17 of the mandrel, urging the slave actuator 20 into the transition surface 13. The load providing mechanism of the master actuator may include, for example a jack screw including a threaded member 25 received by a corresponding threaded portion of the load carrying end cap 24. Rotation of the master actuator 25 relative to the load carrying end cap 24 provides a linear force to the slave actuator 20 via the master actuator 25. The force provided to the slave actuator 20 is enhanced by the mechanical advantage of the threaded assembly.

It will be apparent to those having skill in the art that numerous other load providing systems may be used to apply a linear force on the slave actuator 20, thereby urging the bearing surface 21 toward the transition surface 13. For example, the load providing system may include a hydraulically actuated or similar mechanism.

As can be understood from the above, the captive support 22 is a fixed support member with which the master actuator 25 interacts to transfer a linear force to the slave actuator 20. Consistent with the illustrated embodiment, the captive support 22 may be a cylindrical plug that is affixed in the end of the mandrel body 10. The captive support 22 may be retained in the mandrel body 10 by, for example, welding, threaded fasteners, stakes, adhesive, rivets, etc.

The captive supports 22 may also include features that aid in locating the mandrel relative to a machine tool or other component. The locating feature may include at least one of a protrusion, such as a fixturing and locating boss; a hole in the outward facing surface; or a centering feature, such as the illustrated industrial standard 60° included angle center 27, machined into the outward facing surface of the captive support 22.

The expandable mandrel consistent with the present invention is employed by inserting the mandrel 9 into a hole or recess in a workpiece that has an inside diameter greater than the outside diameter d3 of the un-expanded mandrel 9. The master actuator 25 is advanced toward the slave actuator 20. In the specific illustrated example of a master actuator 25 using a jack screw, the threaded portion of the master actuator 25 is rotated relative to the captive support 22, thereby advancing the pushrod 28 inwardly. Rotation of the threaded portion of the master actuator 25 may be accomplished, for example, by providing the outward facing end of the threaded portion of the master actuator 25 with a feature that may be acted upon by a wrench, such as a hex key.

As the threaded portion of the master actuator 25 is advanced, the pushrod 28 will apply force between the captive support 22 and the slidable slave actuator 20, forcing the bearing surface 21 of the slave actuator against the transition surface 13 of the mandrel body 10. Forcing the slave actuator 20 against the transition surface 13 creates a radially outward force on the mandrel body 10. Because the portion of the mandrel body 10 including the expansion sections 19 is circumferentially discontinuous due to slots 15, the hoop strength in this region is greatly reduced. Therefore, the radially outward force of the slave actuator 20 acting against the transition 13 is sufficient to deflect the expansion sections 19 radially outward. The outward deflection of the expansion sections 19 results in a localized increase of the outside diameter of the mandrel. This deflection of the expansion sections 19 may cause the outside wall of the mandrel to bear on the inside wall of the hole or recess in the workpiece creating a secure interference fit.

The available expansion of the mandrel is dependent upon the characteristics of the expansion sections 19 created by the slots 15. For exampled, a greater number of slots 15 provides expansion sections 19 having a small angular expanse. Expansion sections 19 having a smaller angular expanse are relatively less stiff or resistant to deflection. Similarly, increasing the length of the slots, and therefore, the free length of the expansion sections will also increase the flexibility of the expansion sections 19. The increase in flexibility of the expansion sections requires less force to achieve a given degree of deflection, and therefore expansion of the mandrel diameter.

While the above embodiment is consistent with the present invention, it is merely an exemplary embodiment. The expandable mandrel herein includes a body having an internal passage that includes a first region having a larger cross-sectional area and a second region having a cross-sectional area that is smaller than the cross-sectional area of the first region. The first region and the second region of the internal passage are connected by a transition surface having a sloped, rounded, or tapered profile. The mandrel further includes a plurality of slots or cutouts between an exterior of the body and the internal passage. The plurality of slots or cutouts in turn define a plurality of expansion sections, that is, regions of the mandrel body having an increased susceptibility to outward expansion or deflection.

The expandable mandrel consistent with the present invention also includes an actuation portion. The actuation portion includes a master actuator for providing a force against a slave actuator in a direction that is longitudinal with respect to the first and the second region of the internal passage of the body. The slave actuator is driven against the transition surface of the internal passage between the first region having a larger cross-sectional area and the second region having a smaller cross-sectional area. The interaction of the slave actuator against the sloped, tapered or curved geometry of the transition region translates into an outward force exerted against the mandrel body. The outward force results in an outward deflection of the expansion sections defined by the plurality of slots or cutouts.

The master actuator may be a number of force-developing devices. Suitable force-developing devices may include interacting threaded features, hydraulic actuators, cam mechanisms, etc. Desirably the force developing device is susceptible to maintaining a constant force for a prolonged time period.

The body of the mandrel may be configured in most any desired shape and be received in a hole, recess, or opening in a workpiece having a generally corresponding shape. The mandrel and the hole, recess, or opening in the work piece are desirably sized such that the mandrel in an un-expanded condition may be easily inserted into the hole, recess, or opening. Similarly, the mandrel is preferably sized such that the available expansion of the mandrel is sufficient to increase the cross-sectional area of the mandrel sufficiently to create an interference fit between an exterior surface of the mandrel and an interior surface of the hole, recess or opening in the workpiece.

It should be appreciated by those having skill in the art that the mandrel of the present invention need not be produced from hardened steel. In fact, the mandrel may be formed of softer metals that are readily susceptible to machining operations using conventional machine tools. Therefore, a mandrel consistent with the present invention may be used in a sacrificial manner, wherein machining operations performed on the workpiece may include operations that penetrate into the mandrel. Additionally, the non-hardened state may allow the size of the mandrel to be customized on a project by project basis, rather than being constrained to standard sizes.

It is to be understood that the embodiments that have been described herein are but some of the several which utilize this invention and are set forth here by way of illustration, but not of limitation. It is obvious that many other embodiments, which will be readily apparent to those skilled in the art, may be made without departing materially from the spirit and scope of the invention as defined in the appended claims.

What is claimed is:

1. An expandable mandrel comprising:

a tubular body including an interior surface and an exterior surface, said interior surface defining a central region and a first end region, said first end region having a first diameter greater than a diameter of said central region;

a first transition surface between said first end region and said central region;

a plurality of slots extending between said interior surface and said exterior surface, at least a portion of each of said slots traversing at least a portion of said first transition surface;

a first slave actuator at least partially disposed in said first region and comprising a first bearing surface having a diameter greater than said diameter of said central region; and a first master actuator configured for urging said first bearing surface against said first transition surface, said first master actuator being at least partially disposed in said first region.

2. An expandable mandrel according to claim 1, wherein said first transition surface comprises a sloped surface extending upward from said first region to said central region.

3. An expandable mandrel according to claim 1, wherein said first master actuator comprises a threaded member, wherein advancement of said threaded member urges said first bearing surface against said first transition surface.

4. An expandable mandrel comprising:

a tubular body including an interior surface and an exterior surface, said interior surface defining a central region and a first end region, said first end region having a first diameter greater than a diameter of said central region;

a first transition surface between said first end region and said central region;

a plurality of slots extending between said interior surface and said exterior surface, at least a portion of each of said slots traversing at least a portion of said first transition surface;

a first slave actuator at least partially disposed in said first region and comprising a first bearing surface having a diameter greater than said diameter of said central region;

a first master actuator configured for urging said first bearing surface against said first transition surface; and a first captive support rigidly retained in said body, wherein said first master actuator is configured to apply an expansive force between said first captive support and said first slave actuator, thereby urging said first bearing surface against said first transition surface.

5. An expandable mandrel according to claim 4, wherein said first master actuator comprises a threaded member disposed between said first captive support and said first slave actuator.

6. An expandable mandrel comprising;
a tubular body including an interior surface and an exterior surface, said interior surface defining a central region and a first end region, said first end region having a first diameter greater than a diameter of said central region;
a first transition surface between said first end region and said central region;
a plurality of slots extending between said interior surface and said exterior surface, at least a portion of each of said slots traversing at least a portion of said first transition surface;
a first slave actuator at least partially disposed in said first region and comprising a first bearing surface having a diameter greater than said diameter of said central region;
a first master actuator configured for urging said first bearing surface against said first transition surface;
a second end region said second end region having a second diameter greater than said diameter of said central region;
a second transition surface between said second end region and said central region, at least a portion of each of said slots traversing at least a portion of said second transition surface;
a second slave actuator at least partially disposed in said second region and comprising a second bearing surface having a diameter greater than said diameter of said central region; and
a second master actuator configured for urging said second bearing surface against said second transition surface.

7. An expandable mandrel according to claim 6, wherein said second transition surface comprises a sloped surface extending upward from said second region to said central region.

8. An expandable mandrel according to claim 6, wherein said second master actuator is at least partially disposed in said second region.

9. An expandable mandrel according to claim 6, wherein said second master actuator comprises a threaded member, wherein advancement of said threaded member urges said second bearing surface against said second transition surface.

10. An expandable mandrel according to claim 6, further including a second captive support rigidly retained in said body, wherein said second master actuator is configured to apply an expansive force between said second captive support and said second slave actuator, thereby urging said second bearing surface against said second transition surface.

11. An expandable mandrel according to claim 10, wherein said second master actuator comprises a threaded member disposed between said second captive support and said second slave actuator.

12. An expandable mandrel according to claim 6, wherein said first diameter is equal to said second diameter.

13. An expandable mandrel comprising:
mandrel body including an interior surface and an exterior surface, said interior surface defining first and second interior regions separated by a transition surface, said first region having a cross sectional area greater than a cross-sectional area of said second region;
a plurality of slots extending between said interior surface and said exterior surface, each of said slots traversing at least a portion of said first and second regions;
a slave actuator at least partially disposed in said first region and having a bearing surface; and
a master actuator configured for urging said bearing surface against said transition surface, said master actuator being at least partially disposed in said first region.

14. An expandable mandrel according to claim 13, wherein said transition surface comprises a sloped surface extending upward from said first region to said second region.

15. An expandable mandrel according to claim 13, wherein said master actuator comprises a threaded member, and wherein advancement of said threaded member urges said bearing surface against said transition surface.

16. An expandable mandrel comprising:
mandrel body including an interior surface and an exterior surface, said interior surface defining first and second interior regions separated by a transition surface, said first region having a cross sectional area greater than a cross-sectional area of said second region;
a plurality of slots extending between said interior surface and said exterior surface, each of said slots traversing at least a portion of said first and second regions;
a slave actuator at least partially disposed in said first region and having a bearing surface;
a master actuator configured for urging said bearing surface against said transition surface; and
a captive support rigidly retained in said body, wherein said master actuator is configured to apply an expansive force between said captive support and said slave actuator, thereby urging said bearing surface against said transition surface.

17. An expandable mandrel according to claim 16, wherein said master actuator comprises a threaded member disposed between said captive support and said slave actuator.

* * * * *